United States Patent
Wang et al.

(10) Patent No.: US 11,657,529 B2
(45) Date of Patent: May 23, 2023

(54) MULTIPLE CAMERA SYSTEM WITH FLASH FOR DEPTH MAP GENERATION

(71) Applicant: Black Sesame International Holding Limited, Santa Clara, CA (US)

(72) Inventors: Chao Wang, Shanghai (CN); Donghui Wu, San Mateo, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 465 days.

(21) Appl. No.: 17/068,180

(22) Filed: Oct. 12, 2020

(65) Prior Publication Data
US 2022/0114745 A1   Apr. 14, 2022

(51) Int. Cl.
G06T 7/593 (2017.01)
H04N 13/271 (2018.01)

(52) U.S. Cl.
CPC ........... G06T 7/593 (2017.01); H04N 13/271 (2018.05); G06T 2207/10012 (2013.01)

(58) Field of Classification Search
USPC .................. 382/154, 173; 345/419; 396/155
See application file for complete search history.

(56) References Cited

U.S. PATENT DOCUMENTS

| | | | |
|---|---|---|---|
| 9,400,937 B2 * | 7/2016 | Mishra | G06T 7/11 |
| 10,375,378 B2 | 8/2019 | Wu | |
| 10,742,892 B1 * | 8/2020 | Le | H04N 23/741 |
| 2004/0057613 A1 * | 3/2004 | Noto | G06T 7/586 |
| | | | 382/154 |
| 2006/0039690 A1 * | 2/2006 | Steinberg | G06V 40/165 |
| | | | 396/155 |
| 2009/0284627 A1 * | 11/2009 | Bando | H04N 23/843 |
| | | | 382/173 |
| 2013/0182077 A1 * | 7/2013 | Holz | G06T 7/37 |
| | | | 348/46 |
| 2013/0329015 A1 * | 12/2013 | Pulli | G06T 7/593 |
| | | | 348/47 |
| 2015/0003725 A1 * | 1/2015 | Wan | G06T 7/194 |
| | | | 382/154 |
| 2015/0235408 A1 * | 8/2015 | Gross | H04N 13/122 |
| | | | 345/419 |
| 2016/0344996 A1 * | 11/2016 | Olilla | H04N 23/11 |

(Continued)

OTHER PUBLICATIONS

C. Zhou, A. Troccoli and K. Pulli, "Robust stereo with flash and no-flash image pairs," 2012 IEEE Conference on Computer Vision and Pattern Recognition, Providence, RI, USA, 2012, pp. 342-349, doi: 10.1109/CVPR.2012.6247694. (Year: 2012).*

(Continued)

*Primary Examiner* — Kathleen Y Dulaney
(74) *Attorney, Agent, or Firm* — Timothy T. Wang; Ni, Wang & Massand, PLLC

(57) ABSTRACT

An example operation of depth map generation includes one or more of, simultaneously capturing a main-off camera image and an auxiliary-off camera image with an unpowered flash, sparse depth mapping an object based on the main-off camera image and the auxiliary-off camera image, capturing a main-on camera image with a powered flash, foreground probability mapping the object based on the main-off camera image and the main-on camera image and dense depth mapping the object based on the sparse depth map and the foreground probability map.

20 Claims, 11 Drawing Sheets

(56) References Cited

U.S. PATENT DOCUMENTS

2018/0249143 A1* 8/2018 Calpe Maravilla ... G01S 7/4814
2019/0037128 A1   1/2019 Wang et al.
2019/0058859 A1* 2/2019 Price .................... H04N 13/271
2020/0389642 A1* 12/2020 Xu ........................ H04N 13/25

OTHER PUBLICATIONS

J. Sun, J. Sun, S. B. Kang, Z.-B. Xu, X. Tang and H.-Y. Shum, "Flash Cut: Foreground Extraction with Flash and No-flash Image Pairs," 2007 IEEE Conference on Computer Vision and Pattern Recognition, Minneapolis, MN, USA, 2007, pp. 1-8, doi: 10.1109/CVPR.2007.383080. (Year: 2007).*

* cited by examiner

800

MULTIPLE CAMERA SYSTEM WITH FLASH FOR DEPTH MAP GENERATION

BACKGROUND

Technical Field

The instant disclosure is related to image signal processing and specifically providing a multiple camera system with flash for depth map generation.

Background

Currently, an increasing number consumer and robotic systems utilize depth maps of a surrounding environment. Current methods include utilizing stereoscopic cameras, structured light modules, and time-of-flight modules to obtain depth maps. The systems are deficient when images contain low textural differences, reflections, transparency and occlusions.

A method is sought to allow depth mapping in suboptimal conditions.

SUMMARY

One example embodiment provides a method of depth map generation, comprising at least one of simultaneously capturing a main-off camera image and an auxiliary-off camera image with an unpowered flash, sparse depth mapping an object based on the main-off camera image and the auxiliary-off camera image, capturing a main-on camera image with a powered flash, foreground probability mapping the object based on the main-off camera image and the main-on camera image and dense depth mapping the object based on the sparse depth map and the foreground probability map.

Another example embodiment provides a non-transitory computer readable medium comprising instructions, that when read by a processor, cause the processor to perform at least one of simultaneously capturing a main-off camera image and an auxiliary-off camera image with an unpowered flash, sparse depth mapping an object based on the main-off camera image and the auxiliary-off camera image, capturing a main-on camera image with a powered flash, foreground probability mapping the object based on the main-off camera image and the main-on camera image and dense depth mapping the object based on the sparse depth map and the foreground probability map.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
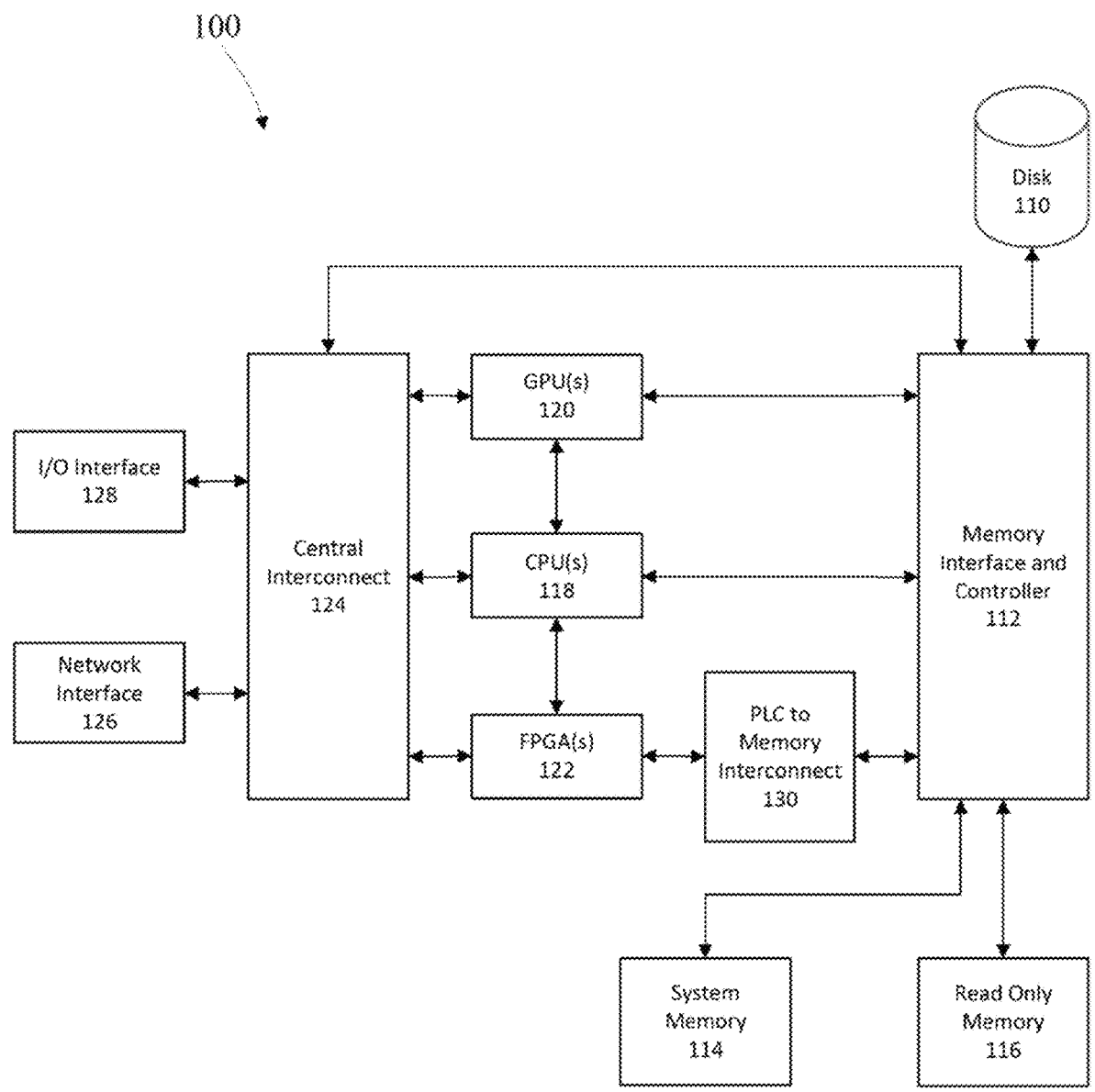
FIG. 1 is a first example system diagram in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate army (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
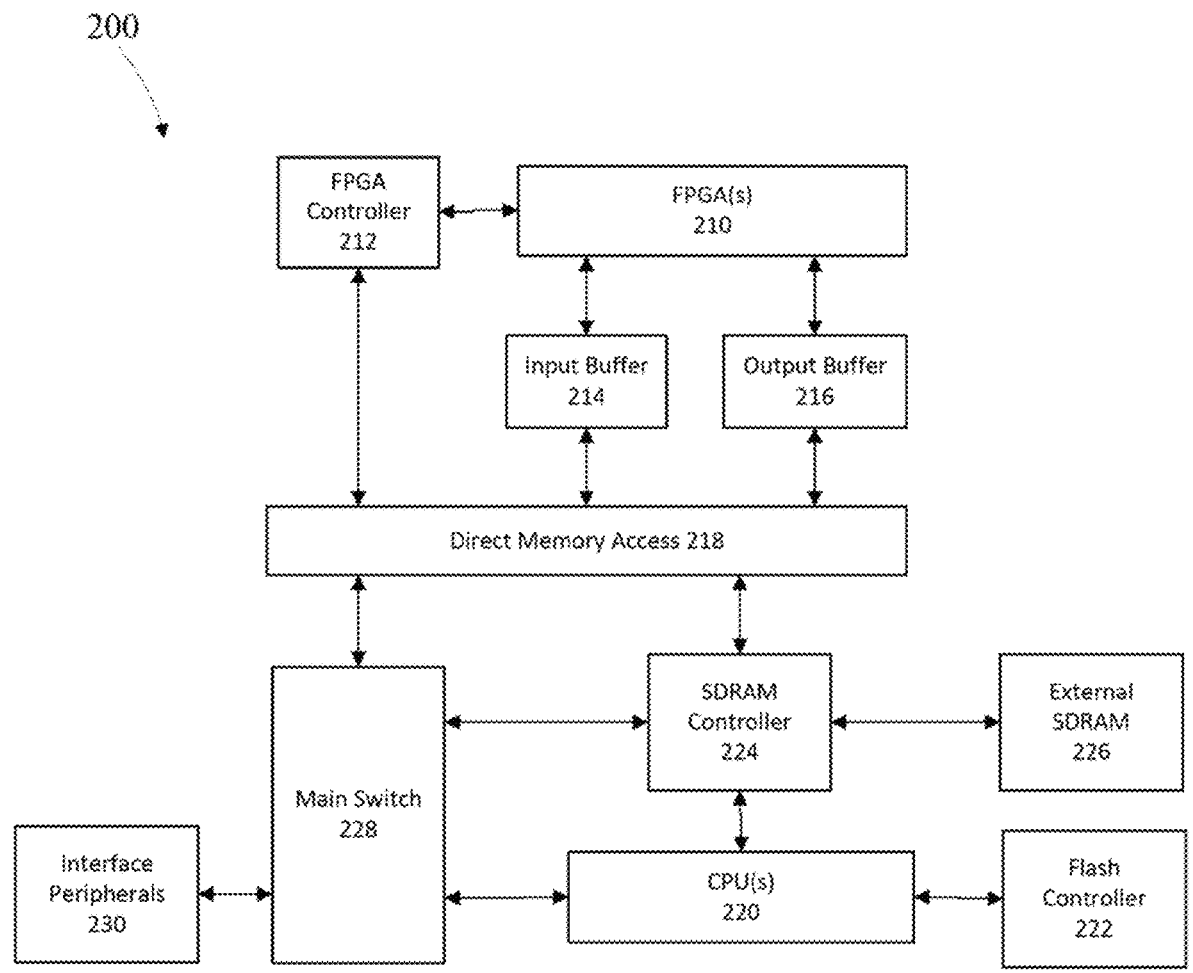
FIG. 2 is a second example system diagram in accordance with one embodiment of the disclosure.

FIG. 2 depicts a second example hybrid computational system 200 that may be used to implement neural nets associated with the operation of one or more portions or steps of process 1100. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Figure 3:
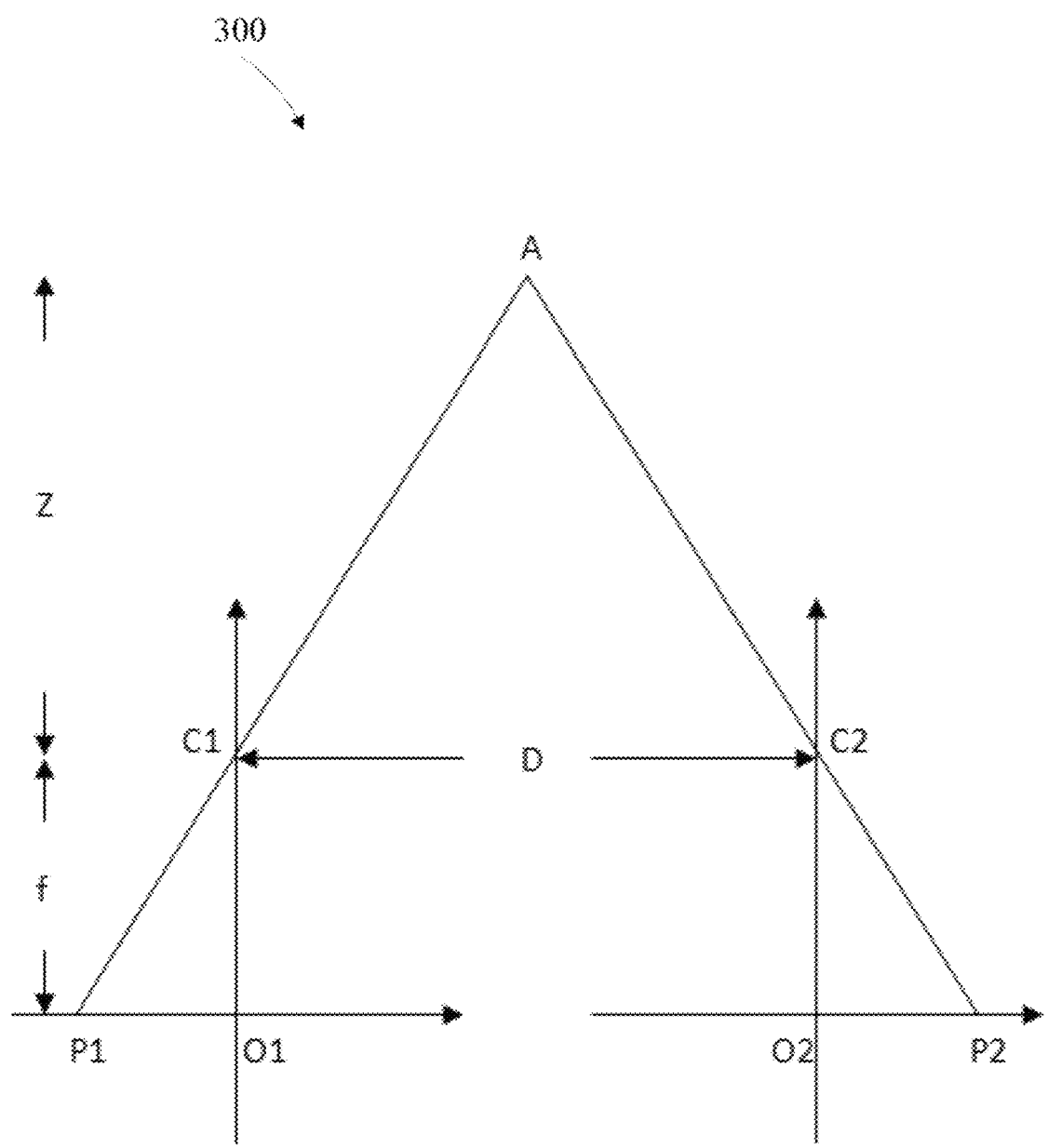
FIG. 3 is an example stereoscopic depth system in accordance with one embodiment of the disclosure.

Multiple cameras placed in different positions convey information of their surrounding environment captured in overlapping fields of view. The simplest case is biomimetic binocular vision. Computer stereo vision systems place two cameras horizontally offset by a known distance between their optical centers. Two slightly different views of a same scene may be captured by these two cameras. When the scene contains moving objects, these two cameras capture images in a synchronized manner. As shown in FIG. 3, light from an object point (A) is transmitted through the entry point of two pin-hole cameras and has two projections (P1 and P2) on the image planes. From triangular similarity, the ratio of disparity d=(P1O1+O2P2) and focal length (f) is equal to the ratio of optical center distance (D=C1C2) and depth (Z) of point $$A: \frac{d}{f} = \frac{D}{Z}.$$

The two cameras may not be identical co-planar pin-hole cameras. In this case a rectification is applied to the images to simulate captured by two identical co-planar pin-hole cameras. This step includes linear and non-linear transformations. The parameters of these transformations are often calibrated in an offline calibration step, in which a controlled scene will be captured by the system. To recover depth from disparity, the focal length (f) and camera distance (D) are used, which may also be calibrated in the offline calibration step.

To compute the disparity, pixel pairs are identified as coming from the same object point via comparing their image similarity. For a pixel in left image multiple pixels may be found in the right image which have approximately the same image similarity, which may lead to a mismatch.

Disparity is currently computed in a sparse manner. Distinct pixels are matched and then some inference algorithm can be employed to diffuse such sparse matching information into a dense matching. There are at least three fundamental problems in current stereo systems, texture-less objects, transparencies and reflections, and occlusions.

Texture-less backgrounds induce difficulties in determining what the 'same object point' is. It may result in many false 1-to-N matches. It may also induce 'weak edges' separating different objects with similar colors and/or brightness's.

Transparent objects alter the light transmission direction of a surface, which is especially serious for curved surfaces. Thus for a transparent object, the triangle relation shown in FIG. 3 does not function properly.

Reflective objects also alter the light transmission direction of a surface, which is also especially serious for curved surfaces. With respect to reflective objects, the triangle relation shown in FIG. 3 again does not function properly.

Figure 4:
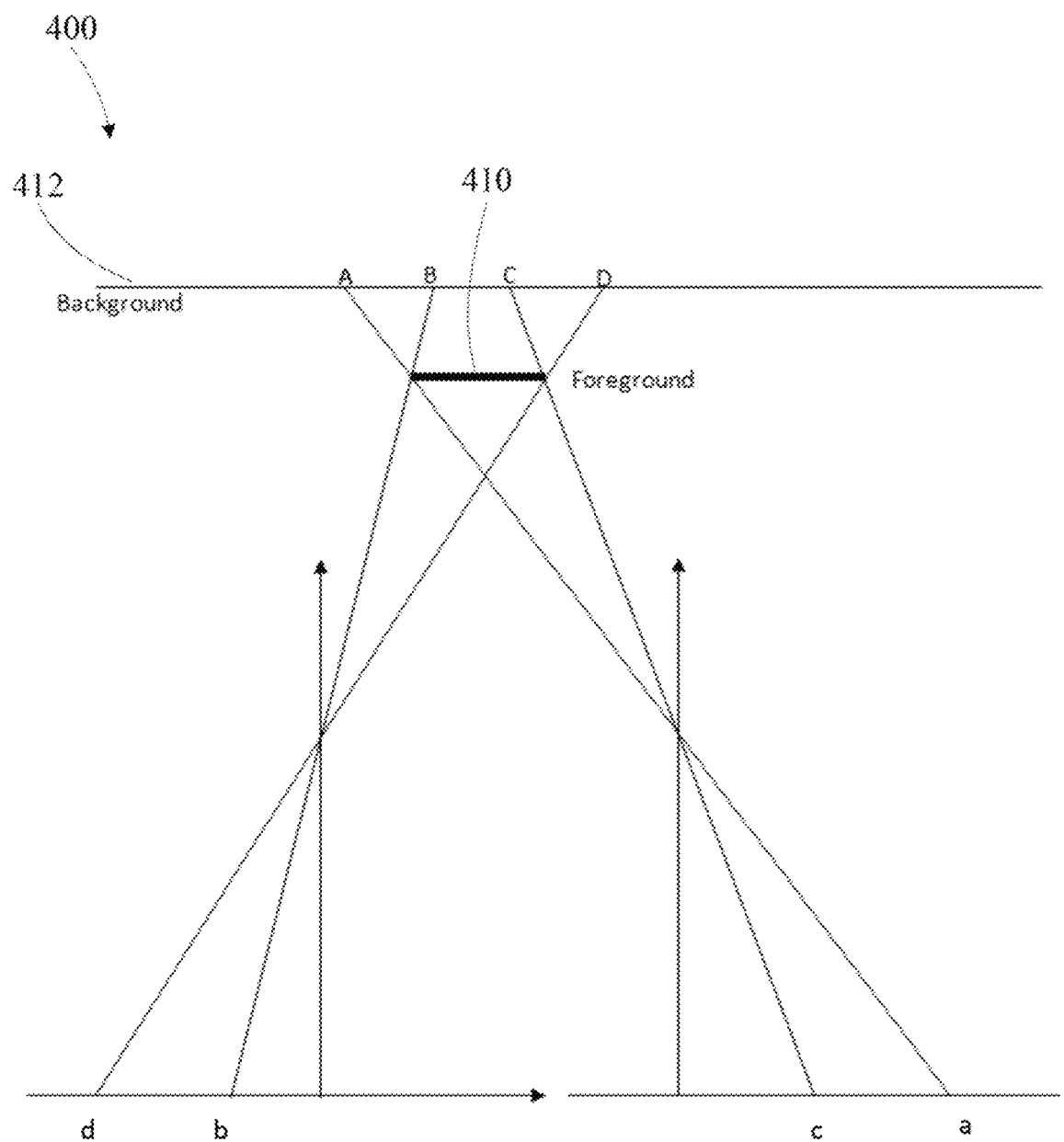
FIG. 4 is an example having a foreground occlusion in accordance with one embodiment of the disclosure.

An occlusion is shown in FIG. 4, a part of background (AB) visible in left image will be blocked by the foreground object 410 in the right image. Another part of background (CD) visible in right image will be blocked by the object in left image. Due to the occlusion these pixels will not be able to find a correct match in another image, so their disparities are uncertain.

In the case where there is a distinct edge, it may provide a useful texture/feature point to find a pixel-pair match. In the instance that the edge is parallel to the baseline, it may increase the difficulty in differentiation.

In the case termed 'peek-through', is an image denoted by a background area surrounded by foreground. In this case there are occluded areas in the peek-through. Small peek-through areas are more difficult to match.

Figure 5:
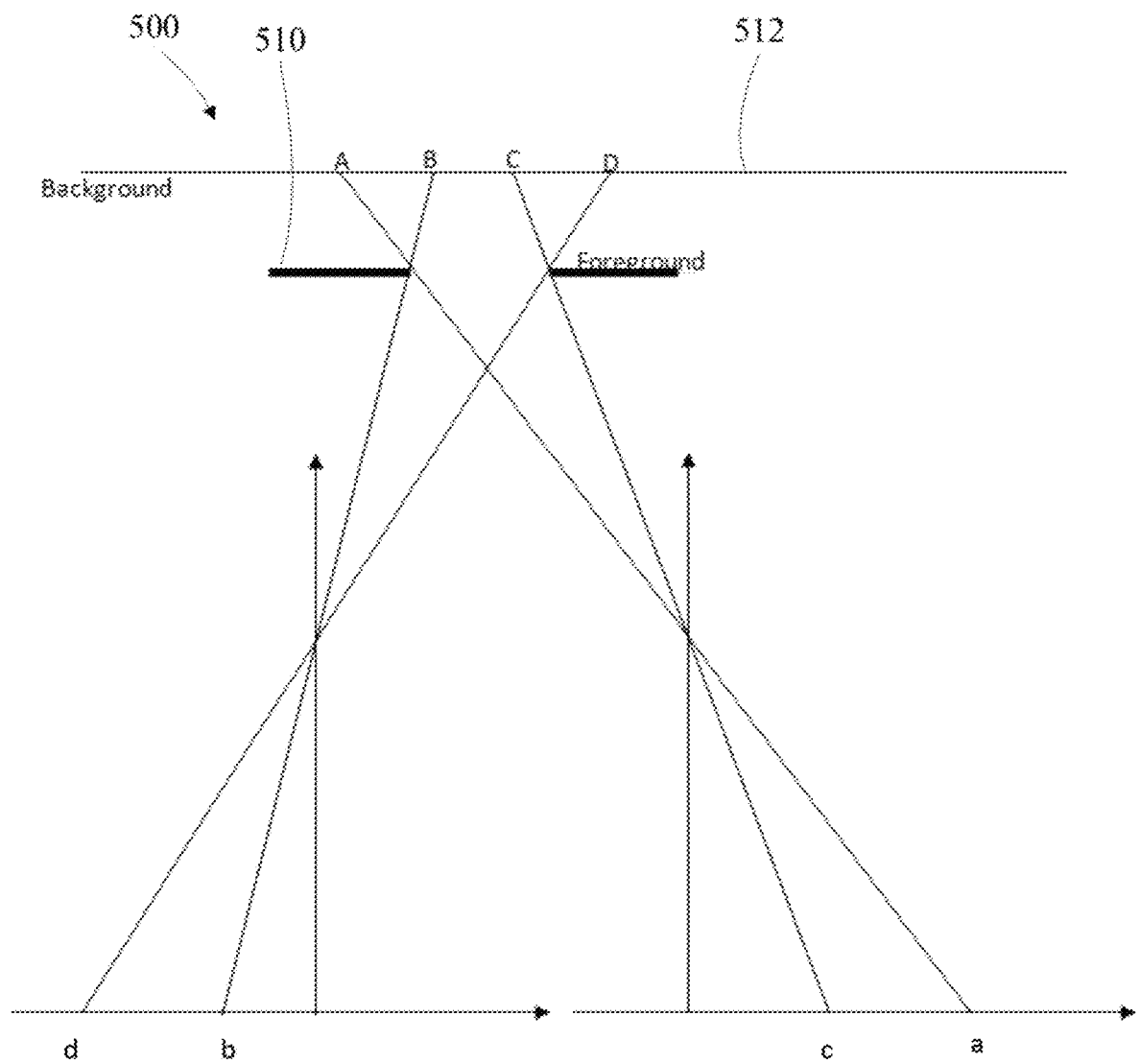
FIG. 5 is an example having a foreground peek-through occlusion in accordance with one embodiment of the disclosure.

In the case that the area is not occluded the matching difficultly increases if there are no textures/features in the area. Peek-through may be a combined case of occlusion and texture-less objects. For an example in FIG. 5, there is a foreground 510 with a hole, the left camera can see the background (BD) through this hole, which is a peek-through. Within this peek-through, the left view. CD cannot be seen by the right camera, as it is in the occluded area. BC can be seen by the right camera, but if there are no textures/features in BC, then it is difficult to determine whether it is background or foreground.

When capturing an image in the dark, such as a dark room, an outdoor evening, etc, the camera cannot capture the scene with an acceptable brightness even when the camera ISO and exposure time are increased without the use of a flash. In this case the flash will be turned on to illuminate the scene and allow the camera to capture the scene with an acceptable brightness.

The flash changes the illumination conditions and thus change the exposure/ISO control of the camera. Furthermore, the flash is an extra illuminant to the scene, and the color temperature will be also changed.

The flash process may be separated into two stages, pre-flash and common-flash. In the pre-flash stage, the flash iteratively energizes at a pre-flash strength, and the data is analyzed to determine the most suitable exposure/ISO control parameters, color temperature parameters and common-flash parameters. The iterative parameter estimation process in pre-flash causes the pre-flash process to be inefficient.

Following the pre-flash stage is the common-flash stage, in the common-flash stage the flash is energized (turned on) with predetermined common-flash strength and the data processed with determined parameters to create a final image.

Stereographic methods avoid utilization of a flash for the following reasons.

Stereographic methods rely on synchronization in brightness and color, the stereo matching algorithm relies on a similar appearance in brightness and color between different cameras. The synchronization between cameras is difficult when the flash is energized (turned on). The flash strength, exposure control and color temperature of the main camera and those of the auxiliary cameras need to be determined in pre-flash process. The iterative pre-flash process is time inefficient. A smooth surface of a near object may exhibit reflectance if the flash is energized (turned on), reflectance causes issues in stereo matching.

In the disclosed method, the camera system includes a flash, a main camera, and at least one auxiliary camera. The main camera and flash are placed proximate to one another. The auxiliary camera(s) are placed in different positions with overlapped fields of view with the main camera. The camera system also includes control logic to control the main camera, auxiliary cameras and the flash.

Stereo vision may provide the depth information bases on high confidence feature point matching. The disparity may be translated into depth, or distance along the optical axis. If there is no feature point matched due to weak edges, occlusions, peek-through, and the like, the depth map will be degraded.

A flash plays a similar role of a point light source with intensity L, the radiance E due to direct illumination from the flash on surface point P is $$E = L \cdot \rho(\omega_i, \omega_0) \cdot r^{-2} \cdot \cos \quad (1)$$

Where $\rho(\omega_i, \omega_0)$ is the surface BRDF (bidirectional reflectance distribution function), $\omega_i$ and $\omega_0$ are flash and view directions with respect to the local coordinate frame at P, r is the distance from the flash, and 0 is the angle between the flash direction and the surface normal at P. This inverse square law explains why the flash intensity falls off quickly with distance r. Thus the foreground is generally lit up more greatly than the background. It will also be affected by angle. In the stereo vision, the most difficult problem is to determine pixels in the neighborhood due to weak edges, occlusions and peek-through, the flash will provide a new perspective to differentiate the pixels into different layers, as it will increase the contrast on a depth edge, which facilitates determination of a more accurate depth layer.

In the disclosed method, the flash provides a different contrast on depth edge. Carefully determination of the exposure control and color related parameters are unnecessary. Due to this no pre-flash process is utilized. Reflection issues may be disregarded because effective lighting shows what portions of the frame is foreground.

For simplicity in explanation, the example will show two cameras, the main camera and auxiliary camera, however, the actual system may provide for a plurality of auxiliary cameras. The method is separated into three parts, a non-flash stereo vision capture, a flash single camera capture, and a determination. The dual cameras captured a stereo vision image, under the control of a backend system, including timing synchronization and brightness/color/AF synchronization, with the flash de-energized (off). Then the main camera will capture a second image with flash energized (on), with the other controlling parameters unchanged, at which point a depth map may be determined.

The main and auxiliary cameras capture the scene in a synchronized way, in timing and in content (color, brightness, focus, etc.). The flash in this stage is de-energized (off). The two images captured are called $I_{main\_off}$ and $I_{aux\_off}$.

In this stage, the backend system will energize the flash (turn it on), with a preset flash strength. The backend system will keep imaging parameters the same as the non-flash process, including exposure control, white balance gain, color matrix, focusing distance, etc. The main camera will capture an image with the flash energized (on), denoted as $I_{Main\_on}$.

Figure 6:
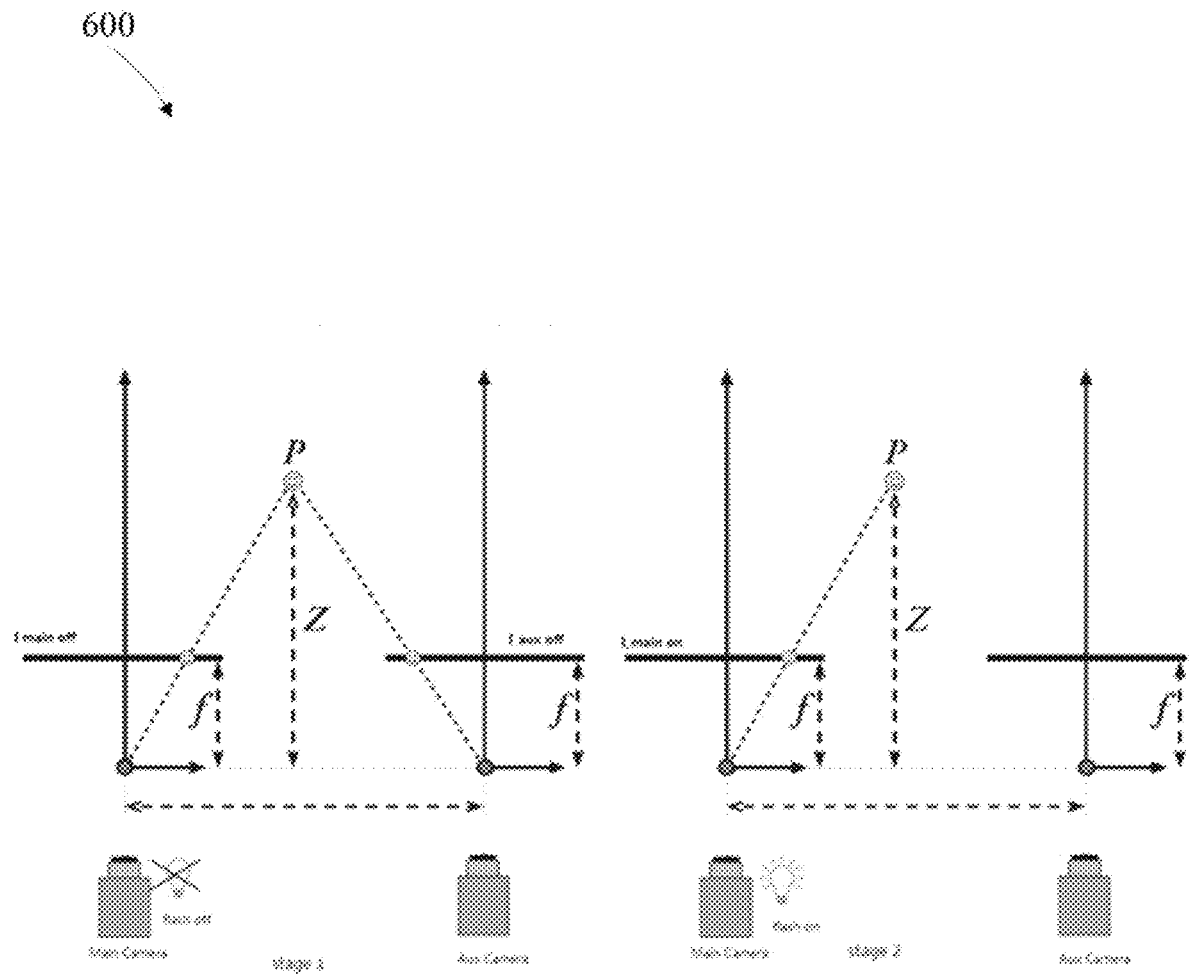
FIG. 6 is an example two step image capture method in accordance with one embodiment of the disclosure.
Figure 7:
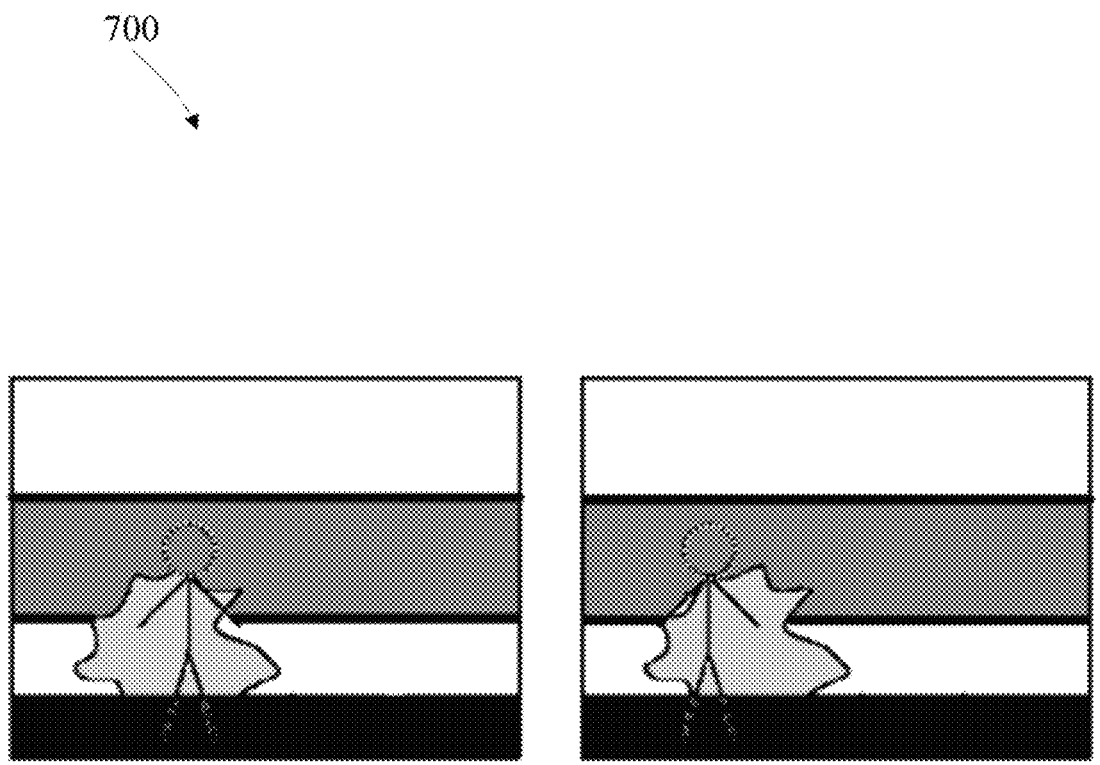
FIG. 7 is an example of a first stage flash off image capture having weak edges in accordance with one embodiment of the disclosure.

An example system is shown in FIG. 6. In the first stage with flash de-energized (off), $I_{Main\_off}$ and $I_{aux\_off}$ are captured as shown in FIG. 7. A weak edge is labelled in dotted circle, which means it is difficult to differentiate the person's head and the texture-less background with similar brightness/color. Additionally, there is texture-less peek-through region between the legs. Also, for the small region to the left of the man's head in the main image, this region is not visible in the aux image, as it is occluded.

Figure 8:
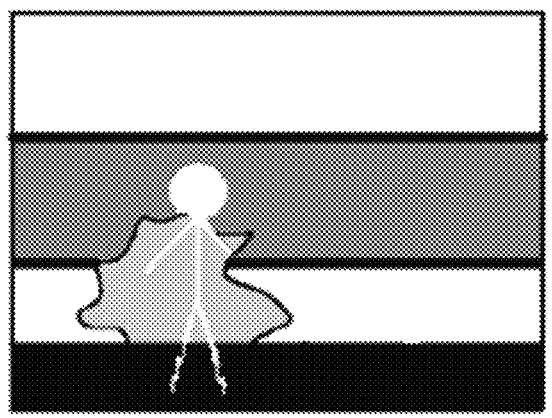
FIG. 8 is an example flash illuminated image in accordance with one embodiment of the disclosure.

When the flash is on, $I_{Main\_on}$ is captured as shown in FIG. 8. Comparing $I_{main\_on}$ (in FIG. 8) to $I_{Main\_off}$ (in FIG. 7), the foreground man is effectively lit up. The weak edge around the head is now easily located. The peek-through between the legs is not significantly lit up, but the legs are lit up, thus the peek-through is not at the similar depth as the foreground. The occluded patch is not lit up, it is a part of background.

From equation (1) since the foreground in the scene is not uniformly lit up by flash, it is related to surface material, angle, distance, etc., thus the absolute depth cannot be determined using $I_{Main\_on}$ to $I_{Main\_off}$. In many applications, the absolute depth is used to determine the subsequent operations. Stereo matching is suitable to this due to the multiple view geometry shown in FIG. 3.

Figure 9:
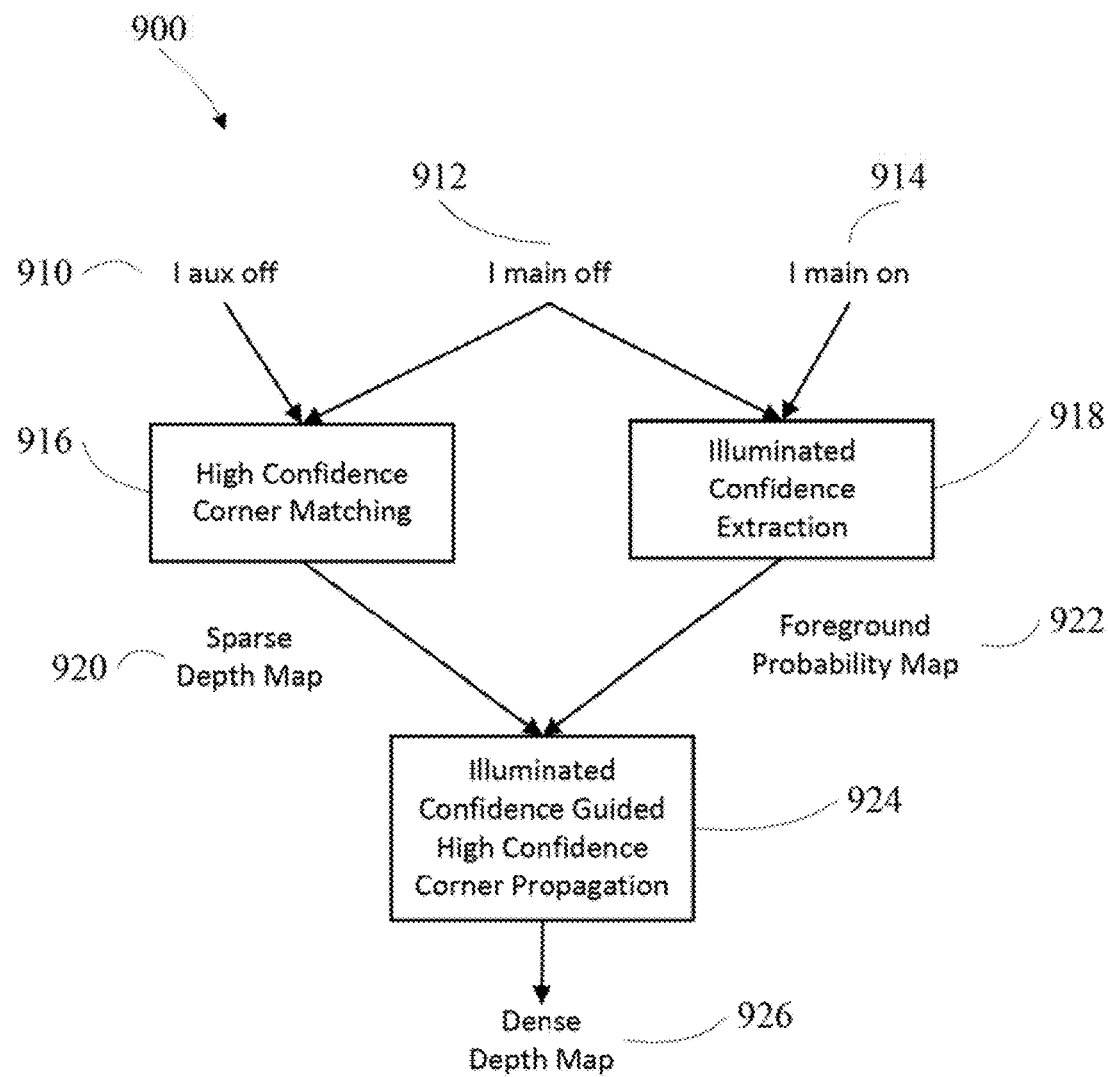
FIG. 9 is an example method flow in accordance with one embodiment of the disclosure.

An example method to recover depth from stereo camera and a flash is depicted in FIG. 9. In this example high confidence corner matching may be sum of absolute distance matching, local binary pattern matching, Harris corner detection and matching, scale invariant feature transform corner detection and matching, and the like.

The Lit-up confidence extraction process analyzes to what extent the pixels in $I_{Main\_off}$ are lit up in $I_{Main\_on}$. It may take the form of any difference operation, e.g., $I_{Main\_on} - I_{Main\_off}$, $I_{Main\_on}/I_{Main\_off}$, $G^{-1}(Main_{on}) - G^{-1}(Main_{off})$, $G^{-1}(Main_{on})/G^{-1}(Main_{off})$, etc, where $G^{-1}(\cap)$ denotes the inverse gamma operation which converts the data back to linear domain, and the like.

Current propagation processes from the sparse depth map to a dense depth map are guided by the information from the images themselves, such as brightness similarity, edge and smoothness. The example method of FIG. 9 includes an additional foreground probability map as an extra data term enforcing the pixel to be propagated from background or foreground. The flash of the disclosed method lights up the foreground and provides extra information on depth edges.

Figure 10:
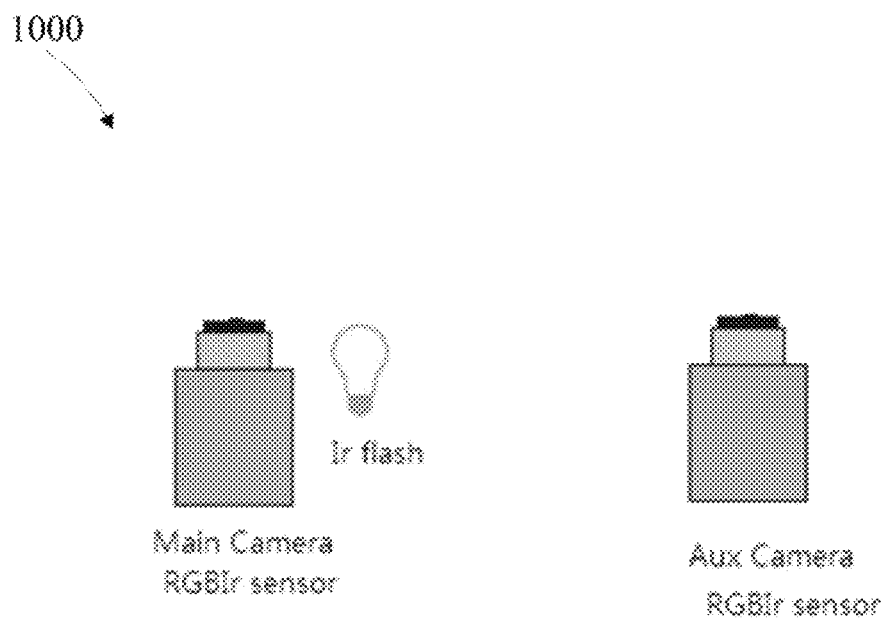
FIG. 10 is an example RGBIr system in accordance with one embodiment of the disclosure.

In another example embodiment an infrared enabled RGBIr camera may capture the scene in visible and near infrared spectral band. An infrared flash may light up the scene in infrared band, which can be captured by RGBIr cameras but invisible to human eye. Thus this possible extension is shown as FIG. 10. This system may enhance data capture in a bright environment.

Figure 11:
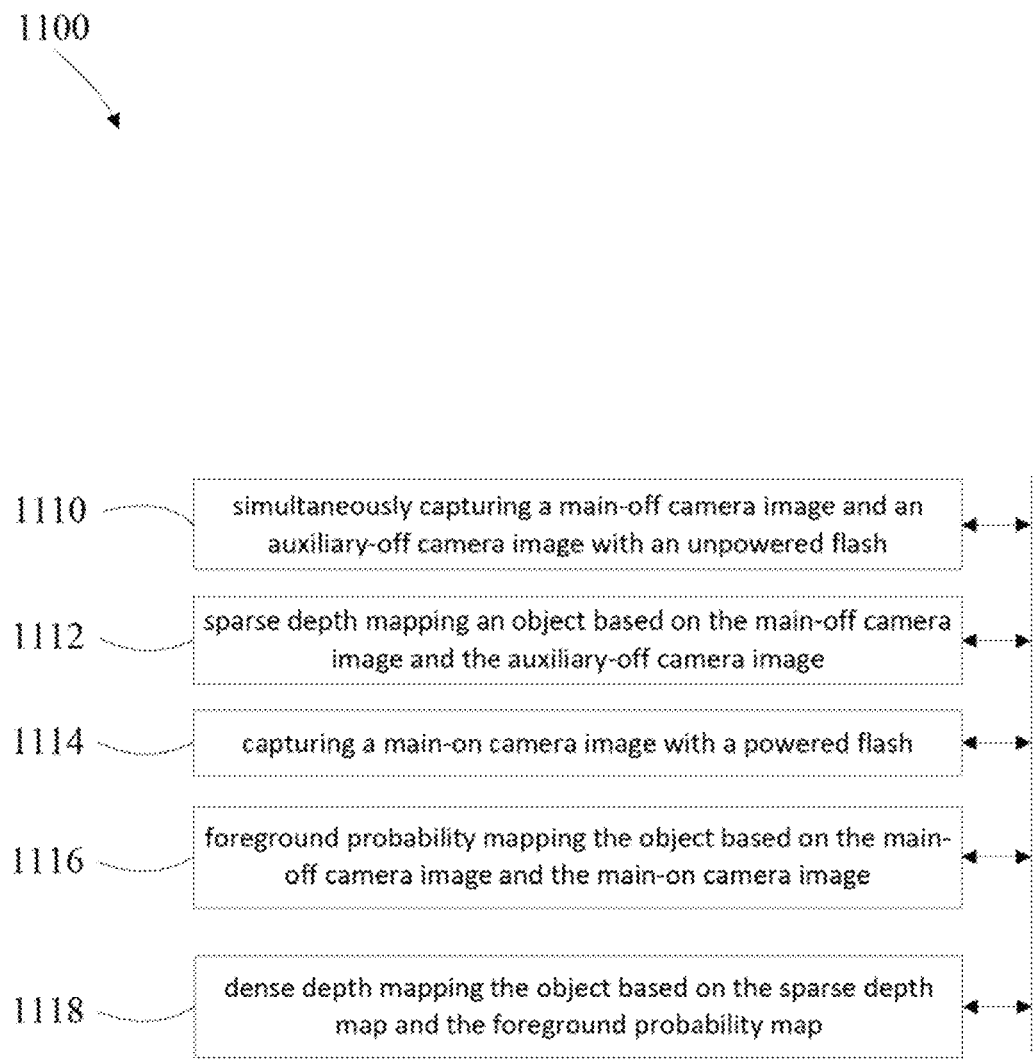
FIG. 11 is an example method in accordance with one embodiment of the disclosure.

FIG. 11 depicts an example method of depth map generation, comprising simultaneously capturing 1110 a main-off camera image and an auxiliary-off camera image with an unpowered flash, sparse depth mapping 1112 an object based on the main-off camera image and the auxiliary-off camera image, capturing 1114 a main-on camera image with a powered flash, foreground probability mapping 1116 the object based on the main-off camera image and the main-on camera image and dense depth mapping 1118 the object based on the sparse depth map and the foreground probability map.

In the example of FIG. 11, the sparse depth mapping may be based on a corner mapping, the foreground probability map may be based on a confidence extraction and the dense depth map may be based on a high confidence corner propagation.

The main-on camera image may be captured utilizing a set of similar control parameters to the simultaneous capture and the powered flash may be set to a preset flash strength and the powered flash may be one of a visible light flash and an infrared flash.

The foreground probability mapping may be based on a set of pixel differences between the main-off camera image and the main-on camera image and the main-off camera image and the auxiliary-off camera image may be captured by RGB cameras.

In another embodiment the main-off camera image and the auxiliary-off camera image may be captured by RGBIr cameras.

In another embodiment a non-transitory computer readable medium comprising instructions, that when read by a processor, cause the processor to perform at least one of simultaneously capturing a main-off camera image and an auxiliary-off camera image with an unpowered flash, sparse depth mapping an object based on the main-off camera image and the auxiliary-off camera image, capturing a main-on camera image with a powered flash, foreground probability mapping the object based on the main-off camera image and the main-on camera image and dense depth mapping the object based on the sparse depth map and the foreground probability map.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of depth map generation, comprising:
   simultaneously capturing a main-off camera image and an auxiliary-off camera image with an unpowered flash;
   sparse depth mapping an object based on the main-off camera image and the auxiliary-off camera image;
   capturing a main-on camera image with a powered flash;
   foreground probability napping the object based on the main-oil camera image and the main-on camera image; and
   dense depth mapping the object based on the sparse depth map and the foreground probability map.

2. The method of depth map generation of claim 1, wherein the sparse depth mapping is based on a corner mapping.

3. The method of depth map generation of claim 1, wherein the foreground probability map is based on a confidence extraction.

4. The method of depth map generation of claim 1, wherein the dense depth map is based on a high confidence corner propagation.

5. The method of depth map generation of claim 1, wherein the main-on camera image is captured utilizing a set of similar control parameters to the simultaneous capture.

6. The method of depth map generation of claim 1, wherein the powered flash is set to a preset flash strength.

7. The method of depth map generation of claim 1, wherein the foreground probability mapping is based on a set of pixel differences between the main-off camera image and the main-on camera image.

8. The method of depth map generation of claim 1, wherein the main-off camera image and the auxiliary-off camera image are captured by RGB cameras.

9. The method of depth map generation of claim 1, wherein the main-off camera image and the auxiliary-off camera image are captured by RGBIr cameras.

10. The method of depth map generation of claim 1, wherein the powered flash is one of a visible light flash and an infrared flash.

11. A non-transitory computer readable medium comprising instructions, that when read by a processor, cause the processor to perform:
    simultaneously capturing a main-off camera image and an auxiliary-off camera image with an unpowered flash;
    sparse depth mapping an object based on the main-off camera image and the auxiliary-off camera image;
    capturing a main-on camera image with a powered flash;
    foreground probability napping the object based on the main-off camera image and the main-on camera image; and
    dense depth mapping the object based on the sparse depth map and the foreground probability map.

12. The non-transitory computer readable medium of claim 11, wherein the sparse depth mapping is based on a corner mapping.

13. The non-transitory computer readable medium of claim 11, wherein the foreground probability map is based on a confidence extraction.

14. The non-transitory computer readable medium of claim 11, wherein the dense depth imp is based on a high confidence corner propagation.

15. The non-transitory computer readable medium of claim 11, wherein the main-on camera image is captured utilizing a set of similar control parameters to the simultaneous capture.

16. The non-transitory computer readable medium of claim 11, wherein the powered flash is set to a preset flash strength.

17. The non-transitory computer readable medium, of claim 11, wherein the foreground probability mapping is based on a set of pixel differences between the main-off camera image and the main-on camera image.

18. The transitory computer readable medium of claim 11, wherein the main-off camera image and the auxiliary-off camera image are captured by RGB cameras.

19. The non-transitory computer readable medium of claim 11, wherein the main-off camera image and the auxiliary-off camera image are captured by RGBIr cameras.

20. The non-transitory computer readable medium of claim 11, wherein the powered flash is one of a visible light flash and an infrared flash.

* * * * *